(12) United States Patent
Pieper

(10) Patent No.: US 6,964,281 B2
(45) Date of Patent: Nov. 15, 2005

(54) MULTIPLE HYDRAULIC SPOOL VALVE ASSEMBLY WITH A MONOLITHIC BODY

(75) Inventor: Gary J. Pieper, Eagle, WI (US)

(73) Assignee: Husco International Inc., Waukesha, WI (US)

( * ) Notice: Subject to any disclaimer, the term of this patent is extended or adjusted under 35 U.S.C. 154(b) by 209 days.

(21) Appl. No.: 10/360,494

(22) Filed: Feb. 7, 2003

(65) Prior Publication Data

US 2004/0154674 A1   Aug. 12, 2004

(51) Int. Cl.[7] .......................................... F15B 13/08
(52) U.S. Cl. .............................. 137/596.12; 137/596.13
(58) Field of Search ........................... 137/884, 596.12, 137/596.13

(56) References Cited

U.S. PATENT DOCUMENTS

| | | | | |
|---|---|---|---|---|
| 3,881,512 A | * | 5/1975 | Wilke ..................... | 137/596.13 |
| 4,430,927 A | * | 2/1984 | Turnbull ................... | 91/530 |
| 4,736,770 A | * | 4/1988 | Rousset et al. ............. | 137/596 |
| 4,782,859 A | * | 11/1988 | Constantinian .......... | 137/596.2 |
| 5,586,577 A | * | 12/1996 | Cho ....................... | 137/596.13 |
| 5,725,022 A | * | 3/1998 | Taka et al. ................ | 137/596 |
| 5,890,362 A | | 4/1999 | Wilke | |
| 6,505,645 B1 | | 1/2003 | Pack et al. | |

FOREIGN PATENT DOCUMENTS

GB          2178139          2/1987

* cited by examiner

Primary Examiner—John Fox
(74) Attorney, Agent, or Firm—Quarles & Brady LLP; George E. Haas

(57) ABSTRACT

An assembly of a plurality of hydraulic control valves is housed in a single-piece body. For each control valve, a spool bore and an aperture for a pressure compensation valve are provided in the monolithic body. Each spool bore is connected to several return passages and a supply passage that extend through the monolithic body. A pair of workports also is connected to each spool bore. A relief valve return passage also extends through the monolithic body and where needed, apertures for pressure relief valves extend from a surface of the monolithic body intersecting the relief valve return passage and a given workport. A load sense passage and a second supply passage also are formed in the monolithic body.

14 Claims, 3 Drawing Sheets

MULTIPLE HYDRAULIC SPOOL VALVE ASSEMBLY WITH A MONOLITHIC BODY

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to hydraulic valves, and more particularly to assemblies having a common monolithic block housing a plurality of individually operable valves.

2. Description of the Related Art

Construction equipment have movable members which are operated by hydraulic cylinder/piston arrangements and other types of hydraulic actuators and motors. For example, a mini-excavator has a boom that raises and lowers a bucket for moving dirt. The bucket can be replaced with other implements, either stationary or hydraulically powered. Hydraulic actuators are provided to raise and lower the boom and tilt the implement with respect to the boom. Separate hydraulic motors independently drive wheels or tracks on each side of the mini-excavator. Other hydraulic actuators position the boom relative to the mini-excavator cab and rotate the entire boom/cab structure about the drive wheels or tracks. A dozer blade is raised and lowered and the track width can be extended and retracted with other hydraulic circuits. An additional hydraulic circuit often is provided for auxiliary equipment. In total a mini-excavator may have nine or ten actuators.

The flow of fluid to and from each hydraulic actuator is typically controlled by a spool valve which is operated by a user manipulated lever or remote pilot circuit. The spool valve comprises a section of an assembly of all the hydraulic valves for the mini-excavator. Each valve section is formed by a separate body with the plurality of bodies bolted together to form the assembly. Depending on the particular hydraulic function being controlled, a given valve section may also have apertures for receiving pressure relief valves and a pressure compensating mechanism. The use of individual bodies offers the ability to assemble different types of valve sections according to the needs of the particular machine. One drawback of using a series of individual sections to form the valve assembly is the cost associated with machining the numerous faces, sealing grooves, and tie-bolt holes on each section, in addition to the assembly labor.

A common supply passage extends through the assembled sections furnishing pressurized hydraulic fluid to each spool valve, and a common return passage also is provided to return fluid from each valve to the tank of the hydraulic system. Movement of a spool of a valve opens and closes paths between the supply and return passages and the hydraulic actuator connected to workports of the associated valve section.

Because of the number of control devices that need to be connected to the valve assembly and the requirement that the body of each section within the assembly be able to withstand the pressures in the different passages, the size of each body resulted in a relatively large valve assembly. In mini-excavators, as well as hydraulic equipment in general, there is a desire to reduce the size of the valve assembly as much as possible. However incorporating multiple spool valves into a single-piece valve body often presents metal casting difficulties. Therefore, it is desirable to develop a body for housing a plurality of spool valves and other control devices in which the body can be cast as a single, monolithic, piece.

SUMMARY OF THE INVENTION

A monolithic body for a hydraulic valve assembly houses a plurality of spool type control valves. The monolithic body has two opposing ends, first and second sides opposite each other and extending between the two ends, and third and fourth sides opposite each other and extending between the two ends. A plurality of spool bores are in a first plane and run between the two third and fourth sides. Two interconnected return passages are substantially in the first plane and intersect each of the plurality of spool bores. The monolithic body further includes a plurality of pairs of workports with each pair extending from the first side to a different one of the plurality of spool bores. A supply passage is spaced from the first plane and each spool bore has a branch which intersects the supply passage.

In the preferred embodiment of the monolithic body, a relief valve return passage is in a second plane spaced from the first plane within the monolithic body. The relief valve return passage extends transverse to the plurality of spool bores and is connected to the two return passages at each end. A plurality of pressure relief valve apertures are formed as required in one of the third and fourth sides and intersect the relief valve return passage and one of the workports.

Another aspect of the preferred monolithic body has a plurality of pressure compensator apertures located in a third plane. Each pressure compensator aperture is associated with a given spool bore and has first and second link passages that open into the given spool bore. A load sense passage and a supply passage connected to each of the plurality of pressure compensator apertures.

DETAILED DESCRIPTION OF THE INVENTION

Figure 1:
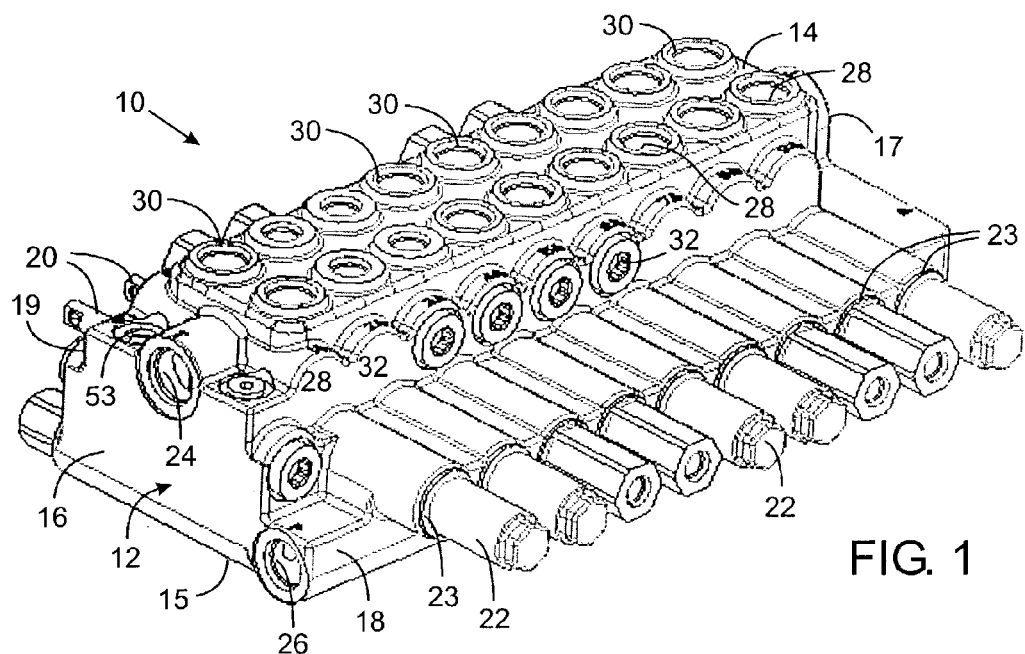
FIG. 1 is an isometric view of a valve assembly incorporating a monolithic body according the present invention.
Figure 2:
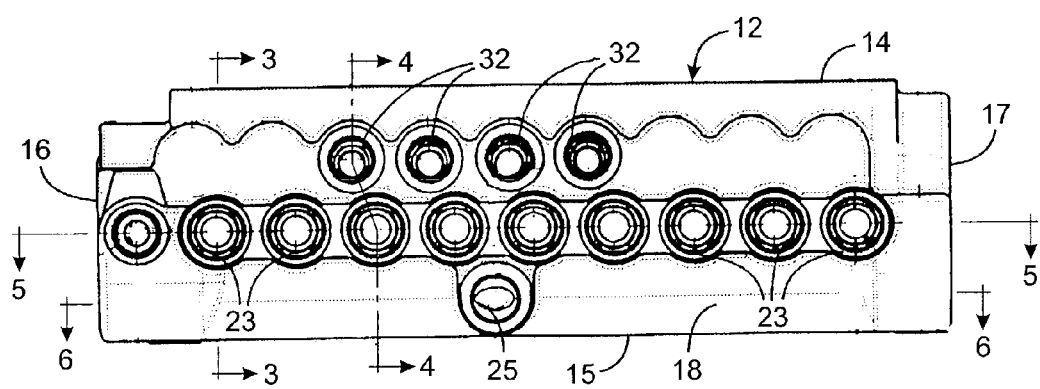
FIG. 2 is a plane view of one side of the monolithic body.

With initial reference to FIGS. 1 and 2, a valve assembly 10 comprises a plurality of spool-type hydraulic valves formed within a monolithic body 12. The monolithic body 12 comprises a single-piece casting which has been machined with various apertures and passages, as will be described. The monolithic body 12 has first and second ends 16 and 17, between which are first and second opposing sides 14 and 15 and third and fourth opposing sides 18 and 19. The spool 20 for each valve is located within a bore 23 that extends between the third and fourth sides 18 and 19 with an end of each spool 20 projecting beyond the fourth side 19 for attachment to an operating mechanism. Spring assemblies 22 are mounted within the openings of the bores in third side 18, but alternatively could be mounted on the fourth side 19. Although the exemplary valve assembly 10 houses nine spool valves, a monolithic body according to the present invention may be provided with a greater and lesser number of valves.

Each end 16 and 17 has a threaded return port 24 for receiving a hydraulic line leading to the system reservoir, or tank. A threaded supply port 26 also is formed in each end 16 and 17 to receive a hydraulic line from a pump to furnish hydraulic fluid under pressure to each of the internal valves. Each valve has a pair of separate workports 28 and 30 formed through the first side 14, however, a single workport may be provided if the associated valve controls a single-acting hydraulic actuator. When the valve assembly is controlling a double-acting hydraulic cylinder, the associated workports are connected to different cylinder chambers. If required, each valve may have a pair of pressure relief valve apertures 32 in third and fourth sides 18 and 19 above the spool bores 23, in order to receive pressure relief valves for each of the associated workports 28 and 30.

Figure 3:
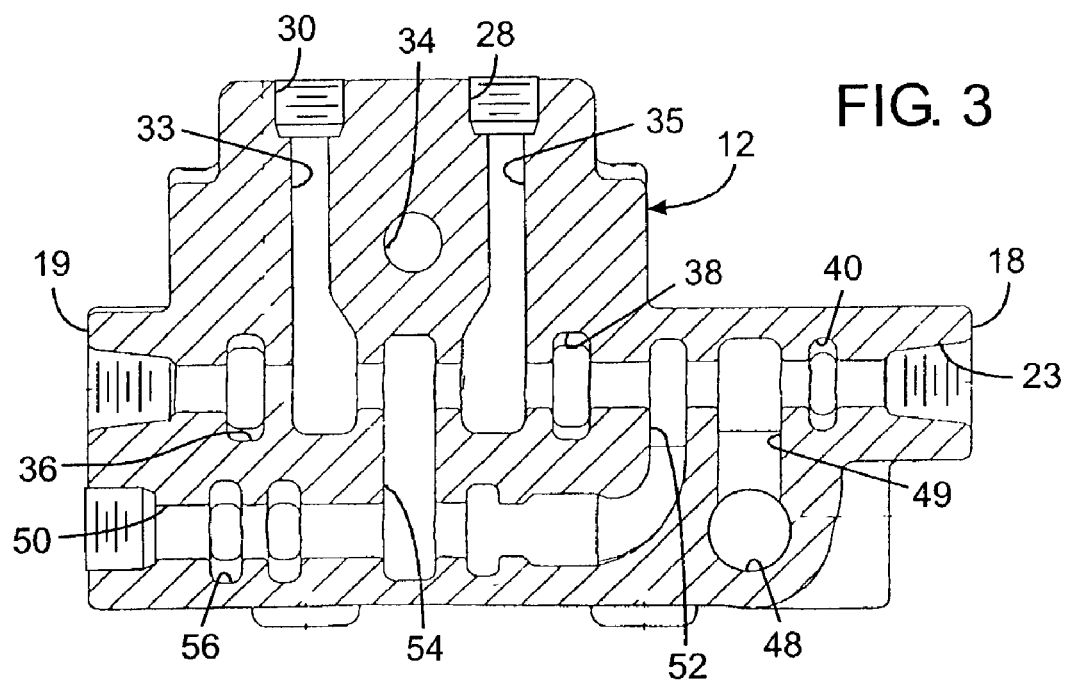
FIG. 3 is a cross section view along line 3—3 in FIG. 2.
Figure 5:
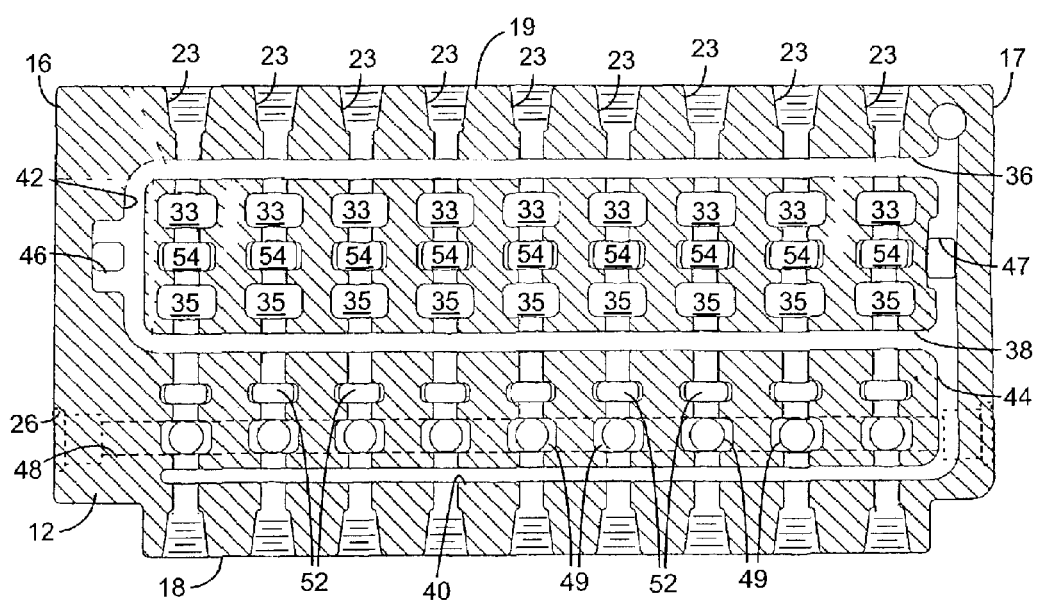
FIG. 5 is a cross section view along line 5—5 in FIG. 2.

FIG. 3 depicts a cross section through the monolithic body 12 at one of the valve positions with the valve spool and other components removed. The workports 28 and 30 extend into the monolithic body and intersect the spool bore 23 at spaced apart locations. A relief valve return passage 34 is aligned with and extends between the return ports 24 in the two ends 16 and 17. Three return passages 36, 38 and 40 extend parallel to the third and fourth sides 18 and 19 through the interior of the monolithic body 12 intersecting each of the spool bores 23 as also shown in FIG. 5. Tank return passage 40 prevents any high pressure fluid that leaks from the supply branches 49 from reaching the seals around the spools at the adjacent end of the spool bores 23. Transverse passages 42 and 44, in the end sections of the monolithic body 12, interconnect the return passages 36, 38 and 40. Each transverse passage 42 or 44 is connected to the relief valve return passage 34 and thus the return ports 24 by a feeder passage 46 or 47, respectively, that extend vertically in the orientation of the monolithic body 12. A supply passage 48 extends between the supply ports 26 in ends 16 and 17 parallel to third side 18 as shown in FIG. 5. The supply passage 48 is beneath the plane of the spool bores 23 which have orthogonal branches 49 leading to the supply passage, as seen in FIG. 3. A lateral supply port 25 is located in the third side 18 and opens into the supply passage 48. Additional return ports can be added above the feeder passages 46 or 47 into the first side 14, if machine installation constraints permit connections into ends 16 and 17. Other lateral supply ports can be added in the third side 18 for similar reasons.

Figure 6:
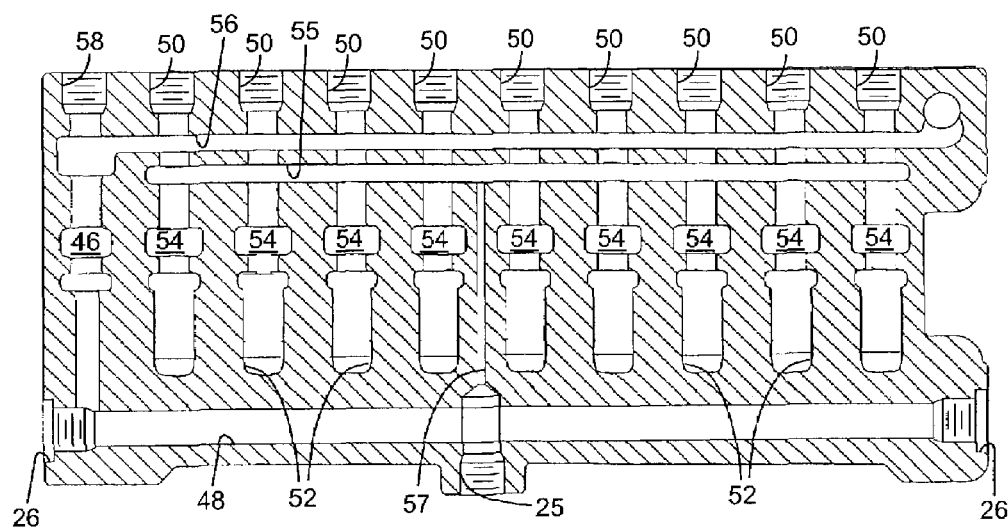
FIG. 6 is a cross section view along line 6—6 in FIG. 2.

Referring to FIGS. 3 and 6, an aperture 50 extends into the monolithic body 12 at each valve location beneath the spool bore 23 on the fourth side 19 for receiving a conventional pressure compensating check valve, such as the one described in U.S. Pat. No. 5,890,362. The pressure compensator aperture 50 communicates with an upwardly extending first link passage 52 which intersects the associated spool bore 23 between the return passage 38 and the supply branches 49. A second link passage 54 connects the pressure compensator aperture 50 to the spool bore 23 at a point between the two workport passages 33 and 35. A load sense passage 56 extends between each of the pressure compensator apertures 50 and a load sense pressure regulator valve aperture 58 in the fourth side 19. A load sense pressure regulator aperture 58 opens into the load sense passage 56 and the tank feeder passage 46, with an additional connection to the supply passage 48. Two ports 53 for the load sense passage 56 are provided in the first side 14 near the first end 16 (FIG. 1) and the end of the load sense passage near the second end 17 forms an extension that is directly below the return passage 36. An aperture can be machined from the first side 14 intersecting passages 36 and 56 to contain a load sense relief valve. A secondary supply passage 55 also extends among the pressure compensator apertures 50 and is connected to the main supply passage 48 by a small lateral passage 57 aligned with the lateral supply port 25. The pressure compensator apertures 50, the secondary supply and load sense passages 55 and 56 and the load sense pressure regulator valve aperture 58 lie in a second plane that is spaced from the first plane of the spool bores 23.

Figure 4:
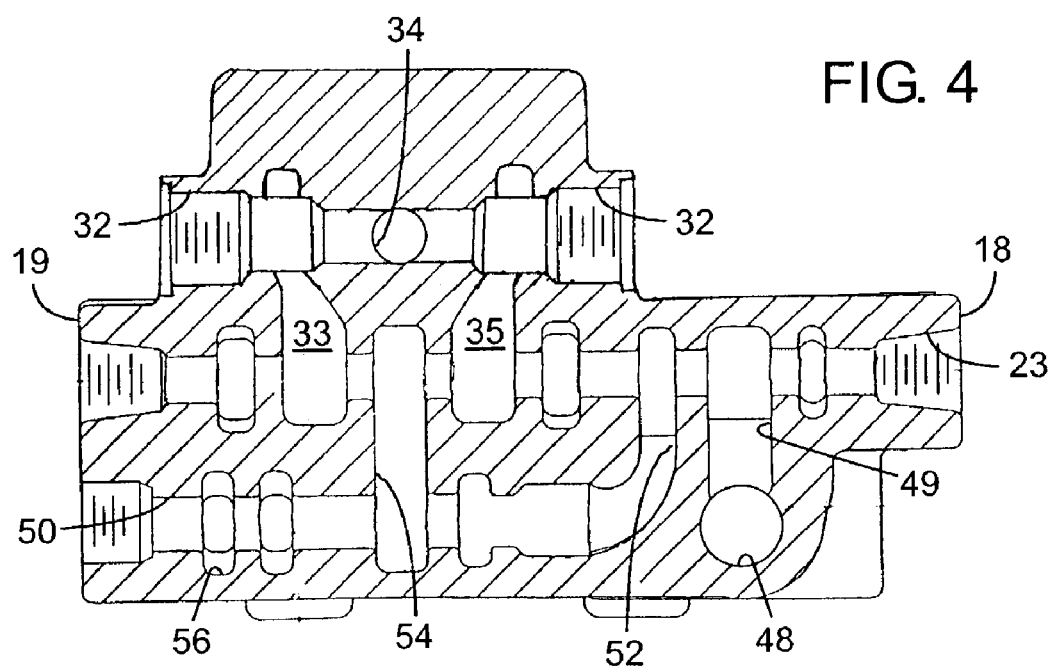
FIG. 4 is a cross section view along line 4—4 in FIG. 2.

With reference to FIGS. 1 and 4, some of the valve sections may require one or two workport pressure relief valves which under extreme pressure conditions opens to provide a path between the workport and the relief valve return passage 34. Such a path relieves the excessive pressure in the workport. For those valve sections, additional pressure relief valve apertures 32 are drilled from the third and fourth sides 18 and 19 of the monolithic body 12 to the relief valve return passage 34, as shown specifically in FIG. 4. These pressure relief valve apertures 32 and the relief valve return passage 34 substantially lie in a third plane that is spaced from the first plane of the spool bores 23 and are offset horizontally from the axis of the spool bores 23, as seen in FIG. 2. This offset allows the bores to be placed closer vertically than would be possible if the two bores were directly above and below each other. Referring to FIG. 4, the two workport passages 33 and 35 are widened side-to-side within the monolithic body 12 so as to intersect the offset of a pressure relief valve aperture 32. Thus, the pressure relief valve bores intersect both workport passages 33 and 35 and the relief valve return passage 34. As a consequence of the offset configuration, insertion of a relief valve into an aperture 32 does not obstruct the flow path 33 or 35. When that relief valve opens, a path is provided between the respective workport passage 33 or 35 and the relief valve return passage 34. By the same means, an anti-cavitation check valve may be installed in an aperture 32, so that fluid can flow from the relief valve return passage 34 and the workport passage 33 or 35.

Referring again to FIG. 3, the spool bore 23 is designed to receive a conventional control spool with lands and notches and allow the control spool to slide therein to control the flow of fluid to and form the workports 28 and 30. In a centered, neutral position of the spool, the lands may block communication between the two workports 28 and 30 and the supply and return passages 48, 36 and 38. Movement of the spool in either direction from center opens communication through a spool notch between the supply passage branch 49 and the first link passage 52 to the pressure compensator aperture 50. Under normal conditions, the pressure compensation valve within the aperture 50 provides a path between the first and second link passages 52 and 54, thereby applying the supply fluid to the intersection of the second link passage 54 and the spool bore 23. Another notch of the spool provides a path between that intersection and one of the workports 28 or 30. Yet another spool notch forms a path between the other workport 30 or 28 and the adjacent return passage 36 or 38. Thus, pressurized fluid from the supply passage branch 49 is applied to one of the workports, while fluid is drained from the other workport into the return passages leading to the tank of the hydraulic system.

The present monolithic body design offers several advantages over conventional valve assemblies formed by bolting individual valve sections side-by-side. In prior conventional designs, such as shown in U.S. Pat. No. 5,890,362, the supply passage intersected every spool bore. As a result, the hydraulic fluid had to flow around several spools in order to reach more remote valve sections, which impeded the flow of the fluid flow creating pressure drops. In the present monolithic body 12, the supply passage 48 is beneath the spool bores 23 providing an unimpeded path between the opposite ends of the monolithic body. This design minimizes the pressure drop from the supply port 26 to the control valves. In addition, the plurality of return passages 36, 38 and 40 provide multiple paths for fluid to flow between a given control valve and the return port 24 of the monolithic body 12. Furthermore, the separate, unobstructed return passage 34 carries fluid from the pressure relief valves in apertures 32 directly to the return port 24.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A monolithic body for a hydraulic valve assembly having a plurality of control valves with spools, said monolithic body comprising:
    two opposing ends, first and second sides opposite each other and extending between the two ends, and third and fourth sides opposite each other and extending between the two ends, a plurality of spool bores extend between the third and fourth sides,
    a plurality of pairs of workports in the first side with each pair connected to a different spool bore,
    a supply passage extending from one of the two opposing ends and transverse to and remote from the plurality of spool bores with each spool bore having a branch which opens into the supply passage,
    a relief valve return passage extending from one of the two opposing ends and transverse to and remote from the plurality of spool bores,
    two return passages connected to the relief valve return passage and intersecting each of the plurality of spool bores, and
    a plurality of pressure compensator apertures each associated with a given spool bore and having first and second link passages opening into the given spool bore.

2. The monolithic body as recited in claim 1 further comprising a load sense passage connected to each of the plurality of pressure compensator apertures.

3. The monolithic body as recited in claim 2 further comprising a secondary supply passage intersecting each of the plurality of pressure compensator apertures.

4. The monolithic body as recited in claim 1 further comprising a plurality of pressure relief apertures extending from the third and fourth sides and intersecting the relief valve return passage, each pressure relief aperture also intersecting one of the workports.

5. The monolithic body as recited in claim 1 wherein each of the plurality of pressure compensator apertures opens through one of the first, second, third and fourth sides.

6. A monolithic body for a hydraulic valve assembly having a plurality of control valves with spools, said monolithic body comprising:
    two opposing ends, first and second sides opposite each other and extending between the two ends, and third and fourth sides opposite each other and extending between the two ends, a plurality of spool bores extend between the third and fourth sides in a first plane,
    two return passages substantially in the first plane intersecting each of the plurality of spool bores and connected to each other,
    a plurality of pairs of workports with each pair extending from the first side to a different one of the plurality of spool bores,
    a supply passage spaced from the first plane wherein each spool bore has a branch which intersects the supply passage,
    a plurality of pressure compensator apertures in a third plane, each pressure compensator aperture associated with a given spool bore and having first and second link passages opening into the given spool bore,
    a relief valve return passage in a second plane spaced from the first plane, the relief valve return passage extending transverse to the plurality of spool bores and connected to the two return passages, and
    a plurality of pressure relief apertures extending from one of the third and fourth sides and intersecting the relief valve return passage, each pressure relief aperture also intersecting one of the workports.

7. The monolithic body as recited in claim 6 further comprising a load sense passage connected to each of the plurality of pressure compensator apertures.

8. The monolithic body as recited in claim 6 further comprising a load sense passage in the third plane and connected to each of the plurality of pressure compensator apertures.

9. The monolithic body as recited in claim 6 further comprising a secondary supply passage intersecting each of the plurality of pressure compensator apertures.

10. The monolithic body as recited in claim 6 wherein each of the plurality of pressure compensator apertures opens through one of the first, second, third and fourth sides.

11. A monolithic body for a hydraulic valve assembly having a plurality of control valves with spools, said monolithic body comprising:
    two opposing ends, first and second sides opposite each other and extending between the two ends, and third and fourth sides opposite each other and extending between the two ends,
    a plurality of spool bores extend between the third and fourth sides in a first plane, two return passages substantially in the first plane intersect each of the plurality of spool bores and are connected to each other,
    a plurality of pairs of workports with each pair extending from the first side to a different one of the plurality of spool bores,
    a supply passage spaced from the first plane wherein each spool bore has a branch which intersects the supply passage,
    a plurality of pressure compensator apertures in a second plane, each associated with a given spool bore and having first and second link passages opening into the given spool bore,
    a relief valve return passage in a third plane spaced from the first plane and the relief valve return passage extending transverse to the plurality of spool bores and being connected to the two return passages, and a plurality of pressure relief apertures substantially in the third plane and intersecting the relief valve return passage, each pressure relief aperture also intersecting one of the workports.

12. The monolithic body as recited in claim 11 further comprising a load sense passage connected to each of the plurality of pressure compensator apertures.

13. The monolithic body as recited in claim 12 wherein the load sense passage is in the second plane.

14. The monolithic body as recited in claim 11 wherein each of the plurality of pressure compensator apertures opens through one of the first, second, third and fourth sides.

* * * * *